E. COWLES.
GYROSCOPE.
APPLICATION FILED FEB. 8, 1919.

1,359,333.

Patented Nov. 16, 1920.
3 SHEETS—SHEET 1.

Inventor
Edwin Cowles
By P. A. Blair
Attorney

E. COWLES.
GYROSCOPE.
APPLICATION FILED FEB. 8, 1919.

1,359,333.

Patented Nov. 16, 1920.
3 SHEETS—SHEET 2.

Inventor
Edwin Cowles

By Attorney

E. COWLES.
GYROSCOPE.
APPLICATION FILED FEB. 8, 1919.

1,359,333.

Patented Nov. 16, 1920.
3 SHEETS—SHEET 3.

Inventor
Edwin Cowles
By Attorney

UNITED STATES PATENT OFFICE.

EDWIN COWLES, OF CLEVELAND, OHIO, ASSIGNOR TO THE GOVERNMENT OF THE UNITED STATES.

GYROSCOPE.

1,359,333.  Specification of Letters Patent.  Patented Nov. 16, 1920.

Application filed February 8, 1919. Serial No. 275,908.

*To all whom it may concern:*

Be it known that I, EDWIN COWLES, a citizen of the United States, and a resident of Cleveland, county of Cuyahoga, State of Ohio, have invented certain new and useful Improvements in Gyroscopes, of which the following is a specification.

This invention relates to gyroscopes, and particularly to gyroscopes of the type which are electrically driven to bring the wheel or rotor up to normal speed and maintain such speed.

It is an aim of the present invention to provide an improved gyroscope, so that a high starting torque is obtained, causing the rotor to be brought up to its normal speed in a relatively short period of time, and the gyroscope may be driven from any form of electrical cell, such as a storage battery, thus dispensing with external sources of mechanical energy necessary for developing alternating current if so desired, and to produce an electrically sustained gyroscope which will be unbalanced as little as possible by internal heating effects.

In accordance with the present invention, the field of the gyroscope revolves, thereby neutralizing the tendency of the earth's field to cause the gyroscope to revolve in azimuth. The rotor or fly wheel is devoid of movable parts and, preferably, it is not provided with electrical windings, so that the possibility of unbalancing the structure due to parts on the rotor becoming loose, or due to the generation of heat in the rotor causing the same to change its form unequally, is eliminated.

The present invention contemplates a gyroscope having an armature or stator provided at each end of the rotor or wheel, and these armatures are alike in structure, and so arranged and associated that they both are affected to the same degree by the heating effect of current passing through the windings, and, therefore, there will be no unequal changes in the armatures tending to interfere with the stability thereof. The armature rings being at the ends of the rotor, the heat developed in such rings is readily dissipated into the surrounding atmosphere without heating up the rotor or other parts of the device to such a degree as to unbalance the same. Furthermore, the armature windings are adjacent the outer rim of the wheel or rotor, so that the electrical forces act through a large radius, resulting in a high torque which enables the gyroscope to come up to speed very quickly.

Further objects of the invention are to provide a gyroscope which is relatively simple and compact in structure and which is efficient and reliable in operation.

The above and other objects of my invention are obtained in the structures described in the following specification and illustrated in the accompanying drawings, and wherein.

Figure 1:
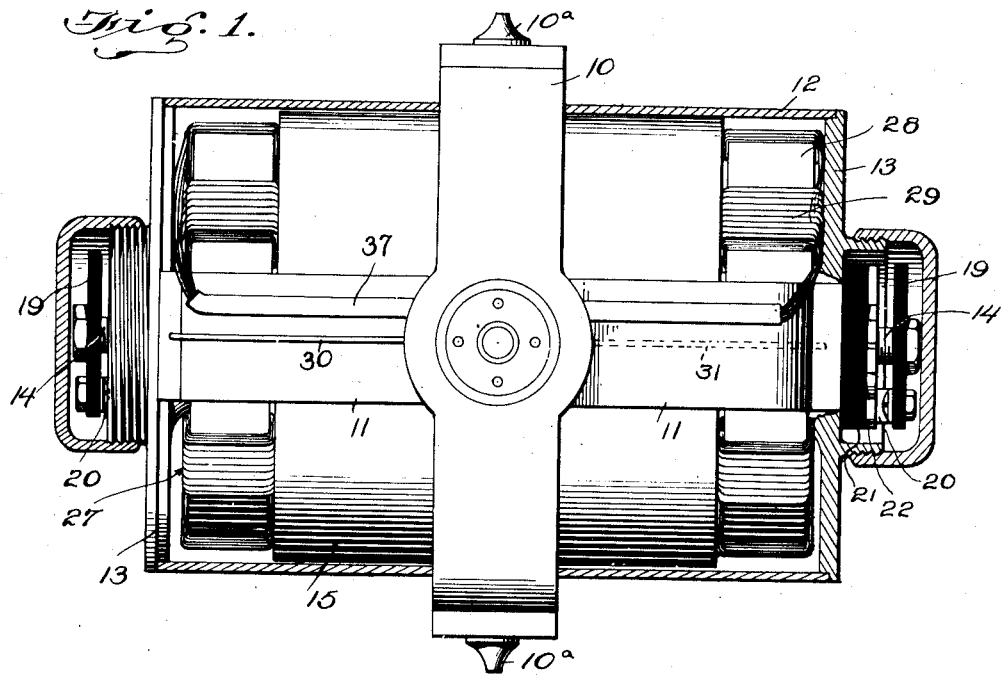
Figure 1 is a side view, partly in elevation and partly in section, of one form of my improved gyroscope.
Figure 2:
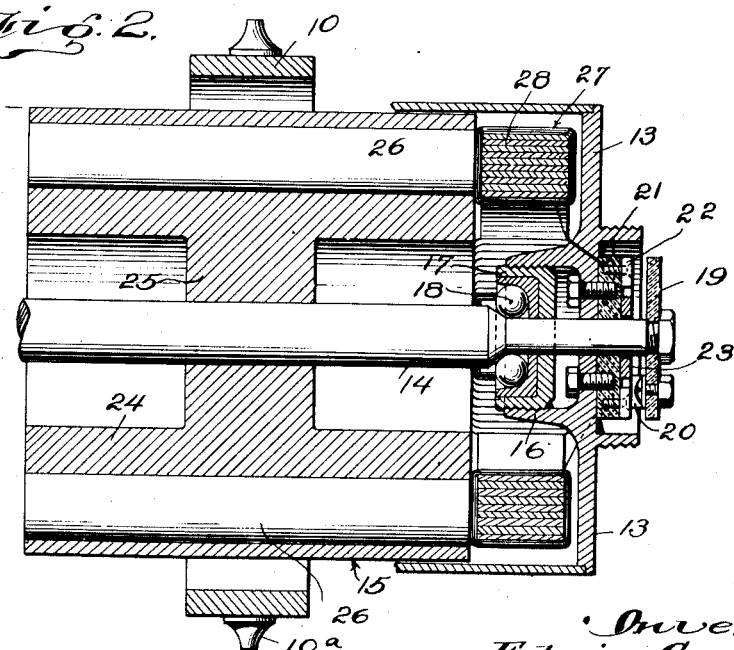
Fig. 2 is a longitudinal sectional view, taken vertically through Fig. 1, the armature at one end of the gyroscope being omitted, as it is a replica of that shown at the other end.
Figure 3:
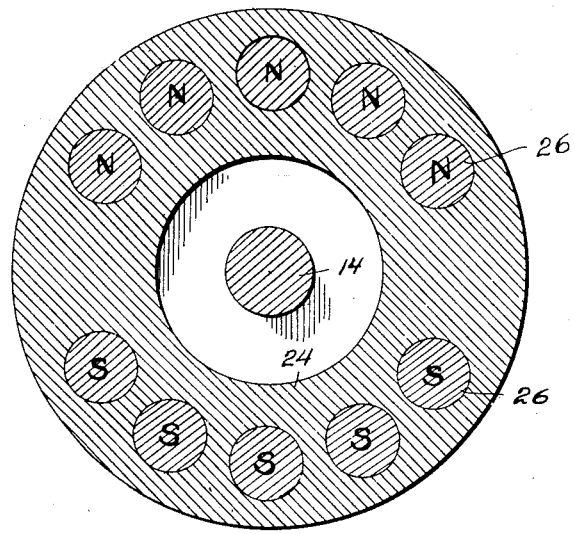
Fig. 3 is a sectional view of the wheel or rotor shown in Figs. 1 and 2.

In the present illustrative disclosure of my invention, I have not shown my improved gyroscope applied to any specific purpose for the reason that it is applicable for uses to which gyroscopes generally are employed, and it may be used in any combination or apparatus.

Referring to the drawings in detail, and particularly to that embodiment of my invention shown in Figs. 1 to 3, 10 designates an outer gimbal ring having trunnions $10^a$ pivoted in a suitable support, not shown, so that the ring may rotate about the axes of the trunnions. Trunnioned within the gimbal ring 10 is an inner gimbal ring 11, which, in the present disclosure, carries a cylindrical casing 12 normally disposed at right angles to the plane of the ring 10. If desired, the casing 12 may be omitted, the purpose of this casing being to prevent dust and the like from gaining access to the armatures and rotor. The numerals 13 designate the end plates of the casing 12, these end plates being either integral with, or secured to the inner gimbal ring at points intermediate the trunnions thereof. The plates 13 are of circular form and are centrally apertured to accommodate a shaft 14 upon which the rotor or wheel 15 is fixed. Each of the end plates 13 has an inwardly extending annular boss 16, internally threaded to receive a cup 17 in which is located a ball bearing 18 for shaft 14.

The ends of the shaft 14 extend beyond the plates 13 and to each end is fixed a non-conducting disk 19 carrying a brush 20. Secured to the outer face of each plate 13 is an insulating disk 21 having on its outer face a commutator ring 22 and a slip ring 23, concentrically arranged and so positioned that the brush 20, when the shaft 14 rotates, is adapted to wipe across both rings to successively connect the commutator segments with the slip ring.

The rotor 15, formed of brass or other non-magnetic material, has a cylindrical portion 24 and a hub portion 25 through the opening in which the shaft 14 passes, the hub portion being of relatively small thickness, so as to provide a recess at each end of the rotor permitting dissipation of heat.

Extending longitudinally through the cylindrical portion 24 of the rotor, are openings in which permanent magnets 26 are located, these magnets, in the present instance, being ten in number and arranged in two groups, the group on one side of a diametrical plane through the rotor having their north poles at one end of the rotor and the magnets in the other half of the rotor having their north poles at the other end.

Secured to the inner surface of each plate 13 and adjacent the ends of the permanent magnets 26, is an armature 27, these armatures consisting of a core 28 built up of thin strips of soft magnetic iron laminations, and eight ring wound coils 29, these coils being in series with each other and all wound in the same direction. In the present drawings, the number of coils 29 on each armature is eight, and the number of permanent magnets 26 is ten, but it is to be understood that the number of coils and magnets may be varied as desired.

Figure 4:
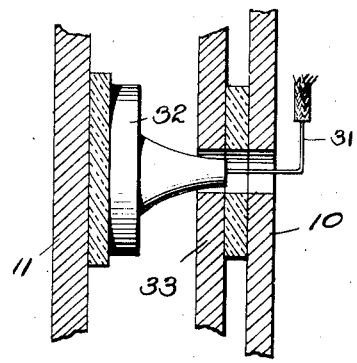
Fig. 4 is a sectional view through one of the trunnions and bearings of the inner gimbal ring.
Figure 5:
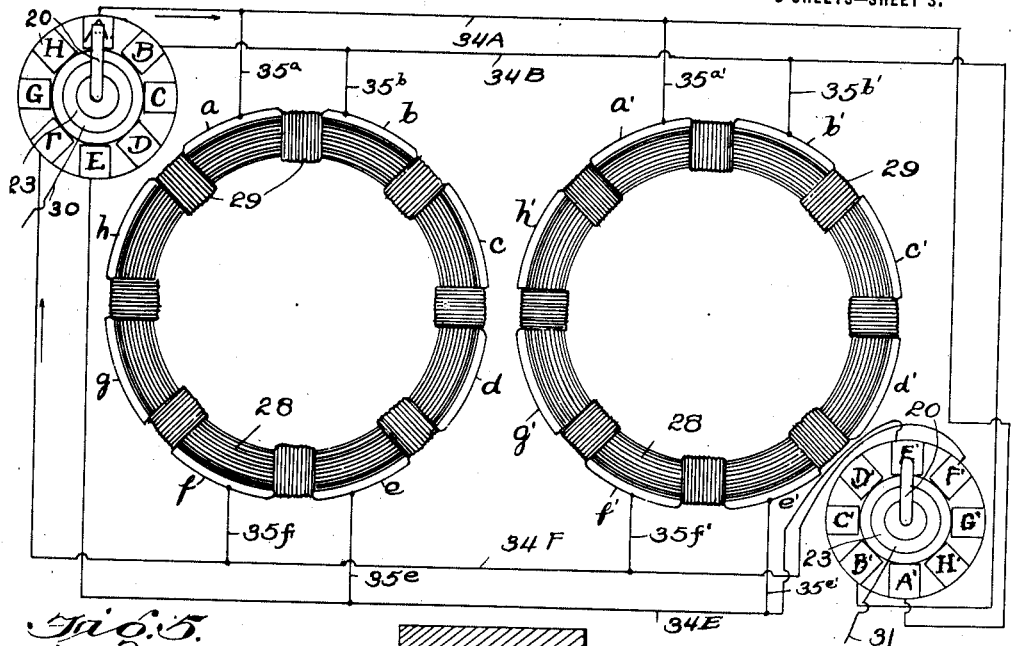
Fig. 5 is a view showing in a diagrammatical manner the windings and electrical connections of the armatures.

In Fig. 5, I have shown, diagrammatically, the manner in which the armatures are wound, the leads between the commutator segments 22 and the armatures, and the electrical connections between the two armatures. Referring to this figure, 30 is a leading in wire connected to one of the slip rings 23, (in the present instance the ring at the left hand side of the drawing), and 31 is a conductor for conducting current from the slip ring of the right hand armature. If desired, the current may be lead to and from connections 30 and 31, through the trunnions 32 of the inner gimbal ring, in which instance these trunnions and the bearings 33 therefor, carried by the outer gimbal ring 10, would be insulated (as shown in Fig. 4) from the respective rings to which they are attached. Of course, any other manner of leading current into and from the armatures may be employed.

The number of segments in each commutator 22 corresponds to the number of coils of its respective armature winding. Each segment of one of the commutator rings is electrically connected to a like point on each armature winding, and to that segment of the other commutator which is diametrically opposite the brush of the second commutator when the brush of the first commutator is on the segment with which the last mentioned segment is electrically connected.

To facilitate the description of electrical connections, the segments of the commutators are designated by large letters of the alphabet, and the points between the coils 29 of the armatures by small letters, the letters indicating parts of the right hand commutator and armature being primed in the drawing. Corresponding segments and points of the armatures bear similar letters.

In the drawings, segment A of the left hand commutator 22 is connected by means of wire $34^A$ with the corresponding segment A' of the right hand commutator, and leads $35^a$ and $35^{a'}$ connect the wire $34^A$ to like points $a$ and $a'$ of the respective armature windings, these points being between adjacent coils 29. The segment E which is diametrically opposite segment A is connected to segment E' by wire $34^E$ and also by means of leads $35^e$ and $35^{e'}$ to points $e$ and $e'$ of the armatures, which points are diametrically opposite the points $a$ and $a'$ respectively. The remaining connections are designated in a similar manner. With this arrangement of wiring, the brushes 20 of the two commutators 22 are at like points on their respective commutators; that is, the left hand brush 20 is in engagement with the upper segment A when the right hand brush is in engagement with the upper segment E', which arrangement would eliminate any tendency of the centrifugal force developed in the brushes to cause the gyroscope to wabble. If unbalancing were still encountered, two brushes at each end could be used.

When the parts are in the position shown in Fig. 5, current will pass through the wire 30, ring 23, brush 20, segment A, wire $34^A$, leads $35^a$ and $35^{a'}$, and thence through both sides of both armatures to diametrically opposite points $e$ and $e'$ on the armatures, through leads $35^e$ and $35^{e'}$ respectively, connection $34^E$ to segment E', through the right hand brush 20 and slip ring 23, and out through the wire 31. Upon rotation of the shaft 14, the brushes are successively brought into positions to close the circuit through the armatures, and current will pass, successively, from segment B through the armatures to segment F'; segment C through the armatures to segment G'; segment D through the armatures to segment H', etc.

It will be noted that upon rotation of the shaft 14 and the parts carried thereby, current will pass to like points on each armature, will split and pass through both sides of each armature, and will pass out from the armatures at diametrically opposite points so that at all times, since the coils 29 are all wound in the same direction, the polarity of one half of the coils is opposite to that of the other half of this design of armature winding will give a constant turning moment. The magnetic path of the motor at any given time is through one set of the cores or magnets 26 to one armature, down through both sides of this armature, through the other set of cores or magnets 26 to the second armature and up through this armature to the starting point in the first set of cores. If desired, the wires 34ᴬ, 34ᴮ, etc., may be brought together and wrapped to form a cable, and, as indicated by the numeral 37 in Fig. 1, this cable may be led about the inner gimbal ring 11.

It will be seen that the structure to one side of a plane passing transversely through the center of the rotor is exactly similar to the structure on the other side of the plane, so that if any expansion or contraction in the parts takes place, the change will be similar in all parts of the device, and therefore such changes will not tend to unbalance the gyroscope. As an armature is placed at each end of the fly wheel 15, the magnetic pull will be balanced, and there will be no thrust upon the bearings.

Figure 6:
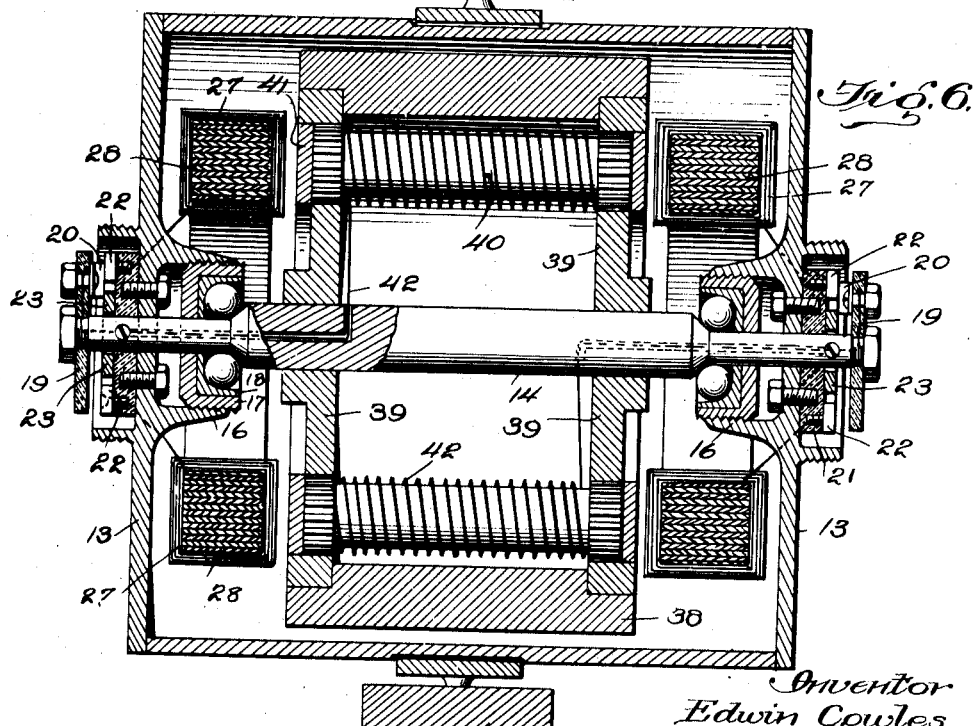
Fig. 6 is a longitudinal sectional view taken on a horizontal plane through another embodiment of my improved gyroscope.

Preferably the rotor is not provided with any windings, but, if desired, the cores may have field windings thereon as shown in Fig. 6. In this figure, the armatures and the manner in which current is led to and from the same, are exactly similar to that described relative to that embodiment of my invention shown in Figs. 1 to 5. The rotor is shown as having a cylindrical rim 38, end plates 39, cores 40 between the end plates 39, and pole pieces 41 carried on the outer face of the end plates 39. About the cores 40 is wound a wire 42, the wire being wound on the cores in such manner that the electromagnets in one semi-cylindrical half of the rotor have their polarity opposite that of those in the other half. The pole pieces 41 connect the two sets of field cores so as to evenly distribute the magnetic flux. In the present instance I have shown one end of the wire 42 leading from the right hand brush 20, and the other end of the wire leading to the left hand brush.

It is of course obvious that my invention is susceptible to various modifications such as the use of alternating instead of direct current, and other changes which would be within the spirit of the invention without departing from the scope of the following claims:

What I claim is:—

1. In a gyroscope, a gimbal ring, a rotor carried by said ring and constituting the flywheel, and a ring wound armature secured to said ring adjacent the end of said rotor, and means for conducting current to and from said armature.

2. In a gyroscope, a gimbal ring, a rotor carried by said gimbal ring and constituting the flywheel and a stator having a ring wound armature secured to the ring adjacent one end of said rotor.

3. In a gyroscope, a gimbal ring, a shaft journaled in said gimbal ring at right angles to the trunnions thereof, a rotor fixed to said shaft and constituting the flywheel, an armature fixed to said ring adjacent one end of the rotor, a commutator carried by said ring, and a brush carried by said shaft and coöperating with said commutator.

4. In a gyroscope, a gimbal ring, a rotor carried by said ring and constituting the flywheel, said rotor comprising a symmetrical member having permanent magnets extending longitudinally therethrough adjacent its outer periphery, and an armature carried by said ring adjacent one end of the rotor.

5. In a gyroscope, a gimbal ring, a rotor carried by said gimbal ring and constituting the flywheel, said rotor having field magnets arranged in two sets of opposite polarity, a ring wound armature secured to the inner ring at one end of the rotor, and having a plurality of field poles, and means for causing a current to enter successively at points midway between the field poles and successively leave at opposite points whereby the current will split passing down each side of the armature.

6. In a gyroscope, a gimbal ring, a rotor carried by said gimbal ring and having its field magnets arranged in sets of opposite polarity, a ring wound armature secured to said gimbal ring adjacent one end of the rotor and having a plurality of field poles, and means for causing a current to enter successively at points midway between the field poles and successively leave at opposite points whereby the current will split passing down each side of the armature.

7. In a gyroscope, a gimbal ring, a rotor carried by said ring and constituting the flywheel, and an armature at each end of said rotor and secured to said ring.

8. In a gyroscope, a gimbal ring, a rotor carried by said ring and constituting the flywheel, a ring wound armature adjacent each end of said rotor and secured to said ring, and means for conducting current to and from said armatures.

9. In a gyroscope, a gimbal ring, a rotor carried by said gimbal ring and constituting the flywheel, and a stator having an armature adjacent each end of the rotor and secured to said ring.

10. In a gyroscope, a gimbal ring, a rotor carried by said gimbal ring and constituting the flywheel, a stator having a ring wound armature adjacent each end of the rotor and secured to said ring, and connections for causing a current to pass successively to points on each armature, split and pass down each side of each armature and flow successively from opposite points in the armatures.

11. In a gyroscope, a gimbal ring, a rotor carried by the gimbal ring and constituting the flywheel, a ring wound armature adjacent each end of the rotor and secured to the ring, and means for conducting current through the armatures to produce a torque.

12. In a gyroscope, a gimbal ring, a rotor carried by the gimbal ring and constituting the flywheel, said rotor having field magnets arranged in two sets of opposite polarity, a ring wound armature adjacent each end of the rotor and secured to the ring, and means for passing a current through both sides of both armatures to produce a torque.

13. In a gyroscope, a gimbal ring, a rotor carried by the gimbal ring and constituting the flywheel, said rotor comprising a symmetrical member having field magnets extending longitudinally therethrough adjacent its outer periphery, a ring wound armature adjacent each end of the rotor and carried by the ring, and means for conducting current through both sides of both armatures.

14. In a gyroscope, a gimbal ring, a rotor carried by the gimbal ring and constituting the flywheel, a ring wound armature secured to the ring at each end of the rotor, a commutator, slip ring and brush for each armature, and connections between the commutators and armatures for conducting current through the armatures to produce a rotating effect therein and causing the current to pass on opposite sides of both the armatures.

15. In a gyroscope, a gimbal ring, a rotor carried by the gimbal ring and constituting the flywheel, a ring wound armature adjacent each end of the rotor and carried by the ring, said armatures having all their coils wound in the same direction, a stationary commutator and slip ring and a rotating brush at each end of the rotor, and connections between each segment of one of the commutator rings to a like point on each armature winding and to that segment of the other commutator which is diametrically opposite the segment of the first commutator from which this lead starts.

16. In a gyroscope, a gimbal ring, a shaft journaled in the gimbal ring at right angles to the trunnions thereof, a rotor fixed to said shaft and constituting the flywheel, an armature adjacent each end of the rotor and fixed to the ring, a commutator and slip ring for each armature and carried by the gimbal ring, a brush for each commutator carried by the shaft and coöperating with its respective slip ring and commutator, and connections between the commutators and armature windings.

17. In a gyroscope, a gimbal ring, a rotor carried by the gimbal ring and constituting the flywheel, a stator secured to the ring adjacent each end of said rotor, and a casing carried by the ring and constituting a housing for said rotor and stator.

Signed at Newport News, Va., this 24th day of January, 1919.

EDWIN COWLES.